United States Patent
Praisner et al.

(10) Patent No.: US 8,075,259 B2
(45) Date of Patent: Dec. 13, 2011

(54) TURBINE VANE AIRFOIL WITH TURNING FLOW AND AXIAL/CIRCUMFERENTIAL TRAILING EDGE CONFIGURATION

(75) Inventors: Thomas J. Praisner, Colchester, CT (US); Eunice Allen-Bradley, East Hartford, CT (US); Shankar S. Magge, South Windsor, CT (US); Keshava B. Kumar, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 497 days.

(21) Appl. No.: 12/371,414

(22) Filed: Feb. 13, 2009

(65) Prior Publication Data

US 2010/0209238 A1 Aug. 19, 2010

(51) Int. Cl.
- F01D 9/00 (2006.01)
- F01D 1/02 (2006.01)
- F03D 11/00 (2006.01)
- F03D 1/04 (2006.01)
- F03D 3/04 (2006.01)
- F03B 1/04 (2006.01)
- F03B 3/16 (2006.01)
- F04D 29/44 (2006.01)
- F04D 29/54 (2006.01)

(52) U.S. Cl. ............................ 415/191; 415/211.2
(58) Field of Classification Search .............. 415/191, 415/211.2; 416/241 R
See application file for complete search history.

(56) References Cited

U.S. PATENT DOCUMENTS

| | | | |
|---|---|---|---|
| 2,867,981 A | | 1/1959 | Berchtold |
| 4,054,398 A | | 10/1977 | Penny |
| 4,233,342 A | | 11/1980 | Aichert et al. |
| 4,741,667 A | | 5/1988 | Price et al. |
| 5,292,230 A | * | 3/1994 | Brown ..................... 416/223 A |
| 5,358,379 A | * | 10/1994 | Pepperman et al. .......... 415/191 |
| 5,553,995 A | | 9/1996 | Martinez |
| 6,004,095 A | | 12/1999 | Waitz et al. |
| 6,179,560 B1 | | 1/2001 | Kouris et al. |
| 6,195,983 B1 | | 3/2001 | Wadia et al. |
| 6,709,233 B2 | | 3/2004 | Haller |
| 6,726,445 B2 | | 4/2004 | Tsuchiya et al. |
| 7,025,563 B2 | | 4/2006 | Servadio et al. |
| 7,116,839 B2 | | 10/2006 | Leboeuf |
| 7,121,792 B1 | | 10/2006 | Fessou et al. |
| 7,195,456 B2 | | 3/2007 | Aggarwala et al. |
| 7,204,676 B2 | | 4/2007 | Dutton et al. |
| 7,300,246 B2 | | 11/2007 | Durocher et al. |

* cited by examiner

*Primary Examiner* — Chuong A Luu
*Assistant Examiner* — Nga Doan
(74) *Attorney, Agent, or Firm* — Kinney & Lange, P.A.

(57) ABSTRACT

An airfoil with turning flow comprises a first surface, a second surface, a leading edge and a trailing edge. The first and second surfaces extend from the leading edge to a trailing edge. A chord extends from a midpoint of the leading edge to a midpoint of the trailing edge, defining a duct angle of at least fifteen degrees with respect to a turbine axis. An axial length of the chord defines an aspect ratio of at most one with respect to an average radial span of the leading and trailing edges. In a region of the trailing edge, an axial angle is at most four degrees and a circumferential angle is at most ten degrees, where the circumferential angle is defined in a direction opposite the turning flow.

25 Claims, 4 Drawing Sheets

TURBINE VANE AIRFOIL WITH TURNING FLOW AND AXIAL/CIRCUMFERENTIAL TRAILING EDGE CONFIGURATION

BACKGROUND

This invention relates generally to airfoils for gas turbine engines, and specifically to turbine vane airfoils. In particular, the invention concerns a turbine vane airfoil configured for turning flow, for example in a transition duct region between high and low pressure section of the turbine.

The gas turbine engine is a power generation system built around a compressor, a combustor and a turbine, which are arranged in flow series with a forward (upstream) inlet and an aft (downstream) exhaust. The compressor compresses air from the inlet, which is mixed with fuel in the combustor and ignited to produce hot combustion gases that drive the turbine, and then are exhausted downstream. Compressed air is also utilized to cool downstream engine components, particularly turbine and exhaust parts exposed to hot working fluid flow.

The turbine is coupled to the compressor via a common shaft or, in larger-scale designs, via a series of coaxially nested shaft spools. Each spool operates at a different pressure and rotational speed, and employs a number of different stages comprised of alternating rotor blades and stator vanes. The rotor blades and stator vanes (generically, "turbine blades") have airfoil surfaces configured to compress incoming air from the inlet, and to extract rotational energy from the hot working fluid in the turbine.

In ground-based industrial gas turbines, power output is typically provided in the form of rotational energy, which is transferred to a shaft and used to drive a rotating mechanical load such as an electrical generator. Because weight is not as great a factor in ground-based applications, industrial gas turbines can be quite large, and utilize complex spooling systems for increased efficiency.

In some configurations, the compressor stages are centrifugal, rather than axial-flow, and can be either directly or indirectly coupled to the turbine shafts. Ground-based turbines are also commonly configured for combined-cycle operations, in which additional energy is extracted from the partially-cooled exhaust gas stream, for example by driving a steam turbine.

Aviation applications include turbojet, turbofan and turboshaft engines. Most modem fixed-wing aircraft employ a two- or three-spool turbofan configuration, as opposed to the older turbojet design. Rotary-wing aircraft (i.e., helicopters) typically utilize turboshaft engines, which deliver energy primarily in rotational form. Turbofan engines, on the other hand, drive a forward fan or ducted propeller to generate thrust via a bypass flow directed around the main engine core. Most turbofans are directly driven by the low-pressure spool, but some advanced designs utilize a reduction gearbox for independent speed control, reducing fan noise and increasing efficiency.

Subsonic aircraft typically employ high-bypass turbofans, in which most of the thrust is generated from the bypass flow and the exhaust generates relatively lower specific thrust, as compared to low-bypass turbofans with higher specific thrust. The engine core also provides power for accessory functions such as pneumatics, hydraulics and environmental control, for example via a bleed air system, an electrical generator, or both.

Auxiliary power units (APUs), which are essentially small gas turbine engines, are also utilized for accessory power. Auxiliary power units are variously configured for ground operations, when the main engines are not turning, as emergency in-flight backups, for independent full-time operation, and for combinations thereof.

Low-bypass turbofans tend to be louder and somewhat less fuel efficient than high-bypass designs, but are also more responsive, and are used for supersonic jet fighters and other high-performance applications. Low-bypass turbofans are also commonly configured for afterburning, in which additional fuel is introduced into an augmentor assembly downstream of the turbine, where it is ignited to provide substantially increased maximum thrust. Thrust augmentation is usually limited to short periods of high demand, on account of the increased operational stress and high rate of fuel consumption.

The gas turbine engine is highly adaptable, and also provides reliable and efficient power sources for specialized applications such as hydrocarbon fuel liquification, high-speed marine craft, armored vehicles and even hybrid cars. In each of these applications, performance ultimately rests upon the turbine's ability to precisely control the working fluid flow. As a result, there is a constant need for improved turbine vane designs, including designs which are adaptable to different turbine configurations and working fluid flows, including turning flows in the high- and low-pressure turbine sections, and in the transition regions between these sections.

SUMMARY

The present invention concerns an airfoil with turning flow, and a turbine vane ring made with a plurality of the airfoils. The airfoil comprises first and second surfaces, which extend from a leading edge to a trailing edge. A chord extends from the midpoint of the leading edge to the midpoint of the trailing edge, defining a duct angle of at least fifteen degrees with respect to the turbine axis. The aspect ratio of the vane is no more than one, as defined by the axial chord length and average radial span. In a region including at least thirty percent of the radially inner span, the axial angle of the trailing edge is at most four degrees and the circumferential angle of the trailing edge is at most ten degrees, where the circumferential angle is defined in a direction opposite the turning flow.

DETAILED DESCRIPTION

Figure 1:
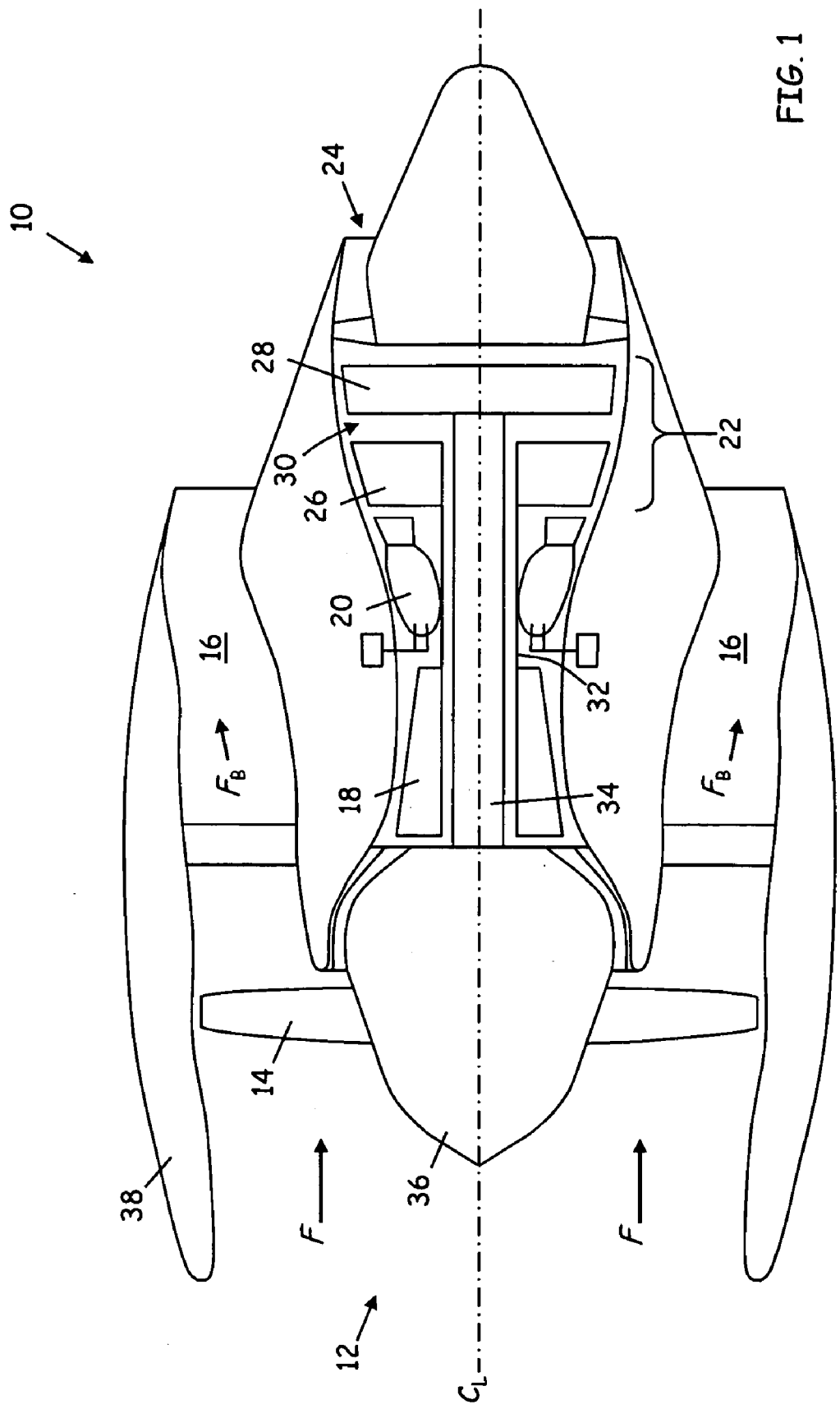
FIG. 1 is a cross-sectional view of a gas turbine engine, in a high-bypass turbofan configuration.

FIG. 1 is a cross-sectional view of gas turbine engine 10, in a high-bypass turbofan embodiment configured for subsonic flight applications. In this particular embodiment, gas turbine engine 10 comprises inlet 12, fan 14, bypass duct 16, compressor 18, combustor(s) 20, turbine 22 and exhaust 24. Turbine 22 comprises high-pressure (HPT) section 26 and low-pressure (LPT) section 28, separated by HPT/LPT transition duct 30. HPT/LPT transition duct 30 comprises a turbine vane ring with turning flow and an axial/circumferential trailing edge configuration, as described below, in order to reduce flow detachment and increase turbine efficiency.

HPT section 26 is coupled via HPT spool shaft 32 to compressor 18. LPT section 28 is coupled via LPT spool shaft 34 to fan 14, mounted on spinner 36 within the forward region of engine cowling 38. LPT spool shaft is 34 is coaxially mounted within HPT spool shaft 32 about turbine axis (centerline) $C_L$, such that the two spools rotate independently.

In operation of gas turbine engine 10, airflow F enters via inlet 12. Fan 14 drives bypass flow $F_B$ through bypass duct 16, generating thrust. The remainder of flow F is converted into a core flow through compressor 18, combustor(s) 20 and turbine 22.

Compressor 18 generates compressed air for combustor(s) 20, where it is mixed with fuel and ignited to produce hot combustion gas. In some embodiments, compressed air from compressor 18 is also used to power various accessory systems, as described above, for example via a bleed air system.

Hot combustion gas exits combustor(s) 20 to enter HPT section 26 of turbine 22, driving HPT spool shaft 32 and compressor 18. Partially expanded combustion gas transitions from HPT section 26 to LPT section 28 via HPT/LPT transition duct 30, and drives fan 14 and spinner 36 via LPT spool shaft 34. Exhaust gas then exits gas turbine engine 10 via nozzle 24.

Although FIG. 1 illustrates a particular two-spool high-bypass turbofan embodiment of gas turbine engine 10, this is merely illustrative. In other embodiments the number of spools varies, and gas turbine engine 10 is configured as any of a low-bypass turbofan, a high-bypass turbofan, a turbojet engine, a turboshaft engine, an industrial gas turbine engine, or as a specialized turbine engine such as a microturbine or APU. In further embodiments, gas turbine engine 10 comprises additional systems including, but not limited to, an afterburner/thrust augmentation system, a generator, bleed air system or other accessory power system, or a combined cycle system.

In these various embodiments, turbine 22 is configured either for aviation or land-based use, and utilizes a variety of working fluids including air, combustion products and steam. In particular, HPT/LPT transition duct 30 is merely an example of one location suitable for the use of a turbine vane ring structure with turning flow and an axial/circumferential trailing edge configuration, as described immediately below.

Figure 2:
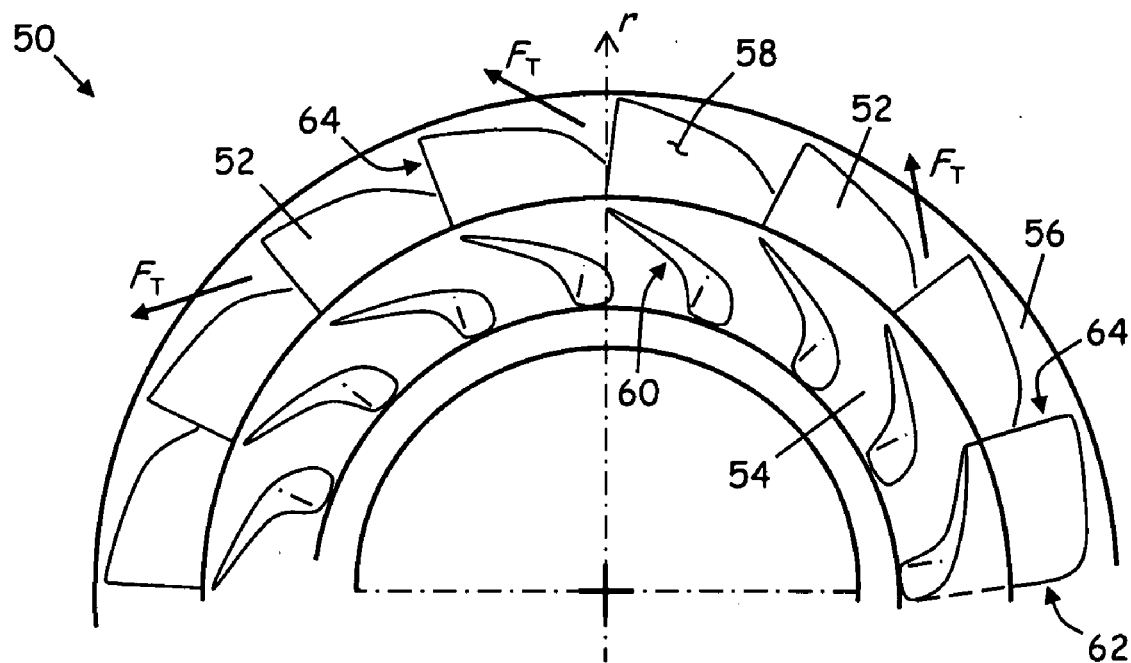
FIG. 2 is a forward-looking (upstream) axial view of a turbine vane ring with turning flow and an axial/circumferential trailing edge configuration.

FIG. 2 is a forward-looking (upstream) axial view of turbine vane ring 50 having a plurality of turbine vanes 52 with turning flow and an axial/circumferential trailing edge configuration. Turbine vane ring 50 and turbine vanes 52 are suitable for operation in a variety of different gas turbine designs, including, but not limited to, the high-bypass turbofan and other turbine configurations described above with respect to FIG. 1.

Turbine vanes 52 are arranged circumferentially about the turbine axis, between inner flow annulus (or inner flow ring) 54 and outer flow annulus (outer flow ring) 56. Radius r is defined individually for each turbine vane 52, through the radially innermost point of trailing edge 64, at inner flow annulus 54. The angular orientation of turbine vane ring 50 is arbitrary, but for illustrative purposes one particular radius r is shown at top dead center, corresponding to the radially innermost trailing edge point of a particular turbine vane 52.

Turbine vanes 52 each comprise an airfoil formed by first and second opposing surfaces 58 and 60. Airfoil surfaces 58 and 60 extend radially across the flow duct between inner annulus 54 and outer annulus 56, and axially across each turbine vane 52 from leading edge 62 to trailing edge 64. In some embodiments, turbine vanes 52 also comprise cooling systems for internal or external cooling fluid flow, but these are not shown in FIG. 2. Similarly, inner flow annulus 54 and outer flow annulus 56 typically comprise mounting structures for positioning duct 50 along a particular gas turbine flow path, but these are not shown.

The primary component of working fluid flow is substantially axial through turbine vane ring 50, which is to say along or parallel to (but spaced from) the turbine axis. Typically, the working fluid flows across turbine vanes 52 such that first (convex) surface 58 is a suction surface, and second (concave) surface 60 is a pressure surface. That is, convex surface 58 is a relatively lower pressure surface with respect to concave surface 60, and concave surface 60 is a relatively higher pressure surface with respect to convex surface 58.

Turbine vane ring 50 and turbine vanes 52 are configured for turning the working fluid flow, imparting a circumferential component or "swirl" onto exit flow $F_T$. As shown in FIG. 2, for example, turbine vane ring 50 and turbine vanes 52 impart flow $F_T$ with a counterclockwise circumferential component. This is generally associated with angular momentum having a right-handed sense with respect to the axial flow direction, which is directed up and out of the plane of FIG. 2. In alternate embodiments, turbine vane ring 50 and turbine vanes 52 are configured to impart the working fluid flow with a clockwise circumferential component, which is generally associated with angular momentum having a left-handed sense.

To achieve efficient turning flow operation while reducing flow detachment and aerodynamic losses, a number of design considerations must be addressed. These include the effects of vane geometry on flow pressure, flow velocity and flow direction, including regions of laminar flow, attached flow, detached flow, turbulent flow and vortex shedding. As a result, turbine vane design requires advanced mathematical and computer modeling techniques, including both linear and nonlinear contributions from fluid dynamics and thermodynamics. Even with these analytical tools, however, modifications to a given vane geometry often yield unanticipated and unpredictable results.

This is particularly true when different forms of modifications are combined, such as modifications to the trailing edge configuration, the aspect ratio and the axial/circumferential trailing edge configuration, as described below. Nonetheless, it is sometimes necessary to modify these factors in concert in order to address particular flow problems. This is particularly true for the problem of flow detachment in turning flow ducts having a significant radial offset between the inlet and outlet, for example when the duct angle is greater than fifteen degrees, as described below.

Figure 3A:
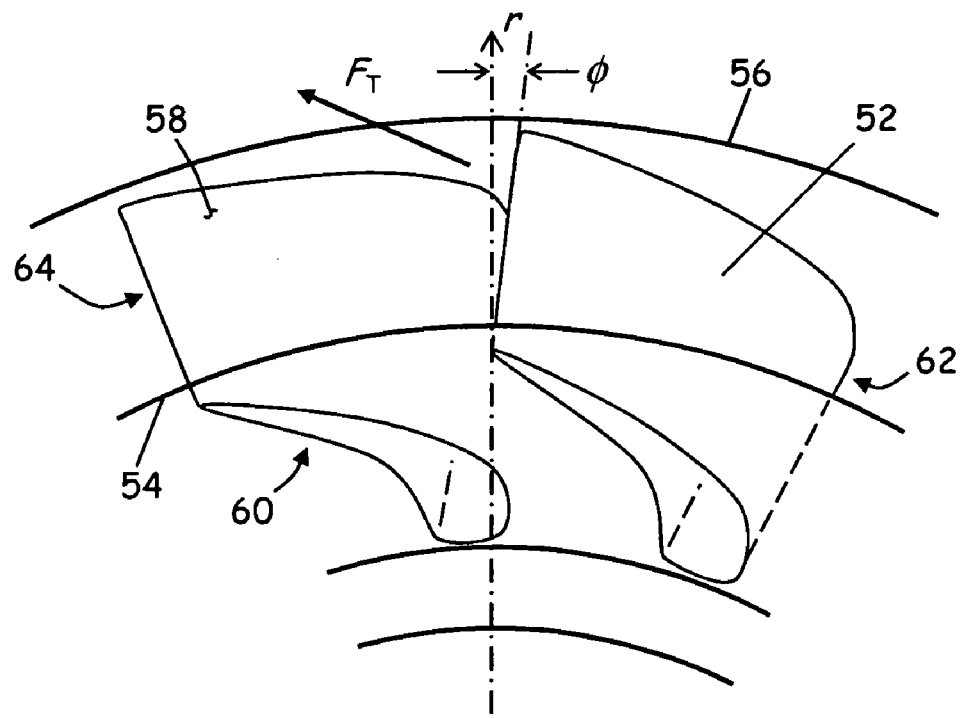
FIG. 3A is an enlarged view of two vanes in the turbine ring of FIG. 2, illustrating the circumferential trailing edge configuration.
Figure 3B:
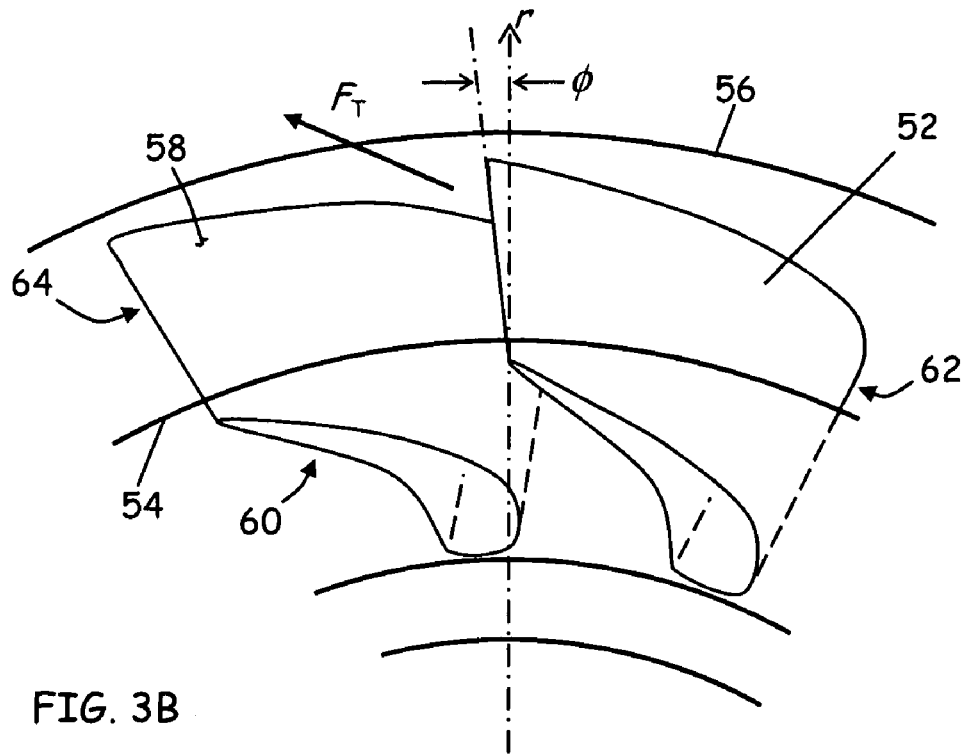
FIG. 3B is an additional view of the turbine vanes in FIG. 3A, illustrating an alternate circumferential trailing edge configuration.
Figure 3C:
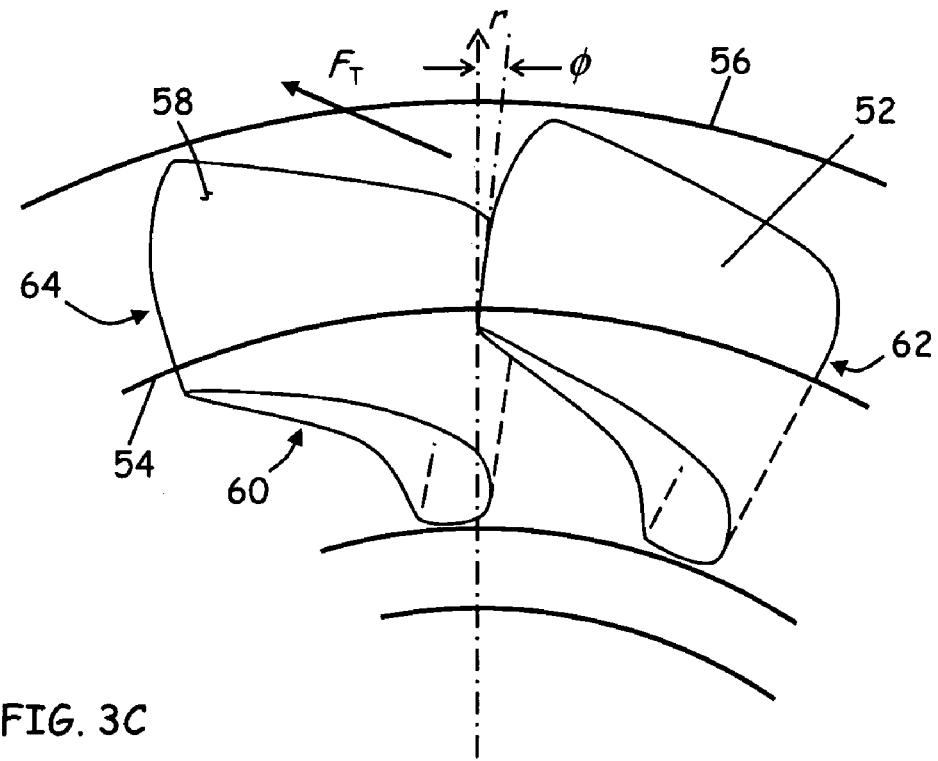
FIG. 3C is a second additional view of the turbine vanes of FIG. 3A, illustrating a second alternate circumferential trailing edge configuration.

FIGS. 3A, 3B and 3C are enlarged views of two vanes 52 from turbine ring 50 of FIG. 2, in embodiments having alternate circumferential trailing edge configurations. In particular, FIGS. 3A-3C differ in circumferential angle φ, as defined along trailing edge 64 with respect to radius r.

Circumferential angle φ is measured between trailing edge 64 and radius r, as projected onto a plane perpendicular to the turbine axis and containing radius r. Radius r is also perpendicular to the turbine axis, and drawn through the radially innermost point of trailing edge 64. The radially innermost point of trailing edge 64 is at inner annulus 54, as described above (see also FIGS. 4A and 4B, below).

Circumferential angle φ is measured as an absolute value or magnitude, with the direction independently defined in terms of turning flow $F_T$. In some embodiments, for example, circumferential angle φ is defined such that trailing edge 64 is oriented "against" (in the opposite sense as, or into) turning flow $F_T$. For a right-handed turning flow, this is a clockwise direction in the forward axial view, as shown in FIG. 3A. In other embodiments, circumferential angle φ is defined such that trailing edge 64 is oriented "with" (in the same sense as, or along) turning flow $F_T$. For a right-handed turning flow, this is a counterclockwise direction in the forward axial view, as shown in FIG. 3B.

In some embodiments, trailing edge 64 is substantially straight and circumferential angle φ is essentially uniform, without respect to radial position along the span of turbine vane 52. As shown in FIG. 3C, however, circumferential angle φ sometimes varies between inner flow annulus 54 and outer flow annulus 56, and is more generally defined with respect to a tangent line drawn through trailing edge 64 in a particular region of interest (see, e.g., tangent point 78 of FIG. 4B).

Where the angle of trailing edge 64 varies, as shown in FIG. 3C, circumferential angle φ is defined by the largest-magnitude value, anywhere in the region of interest. In some embodiments, the region of interest is less than the complete span of trailing edge 64, for example a radially inner region corresponding to thirty-percent span, or a radially inner region corresponding to fifty-percent span (see FIG. 4B). In other embodiments, the region of interest is the complete or entire span of trailing edge 64.

Figure 4A:
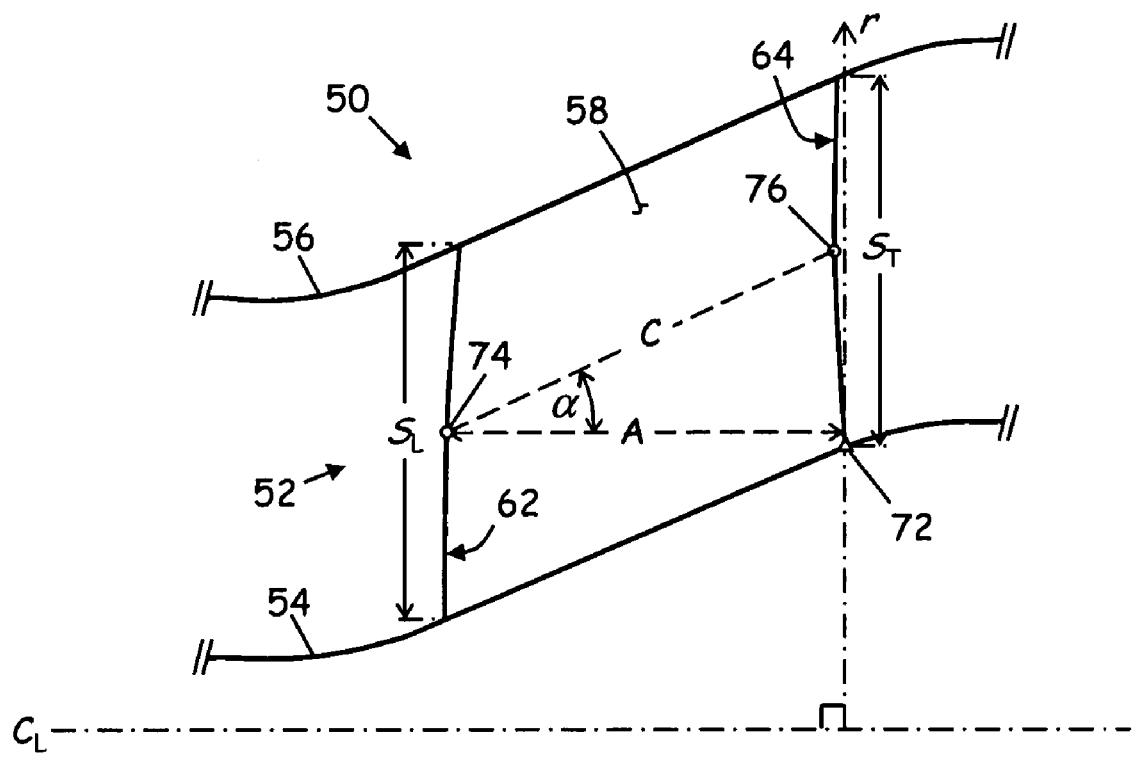
FIG. 4A is a circumferential view of a vane from the turbine ring of FIG. 2, illustrating the aspect ratio and duct angle.
Figure 4B:
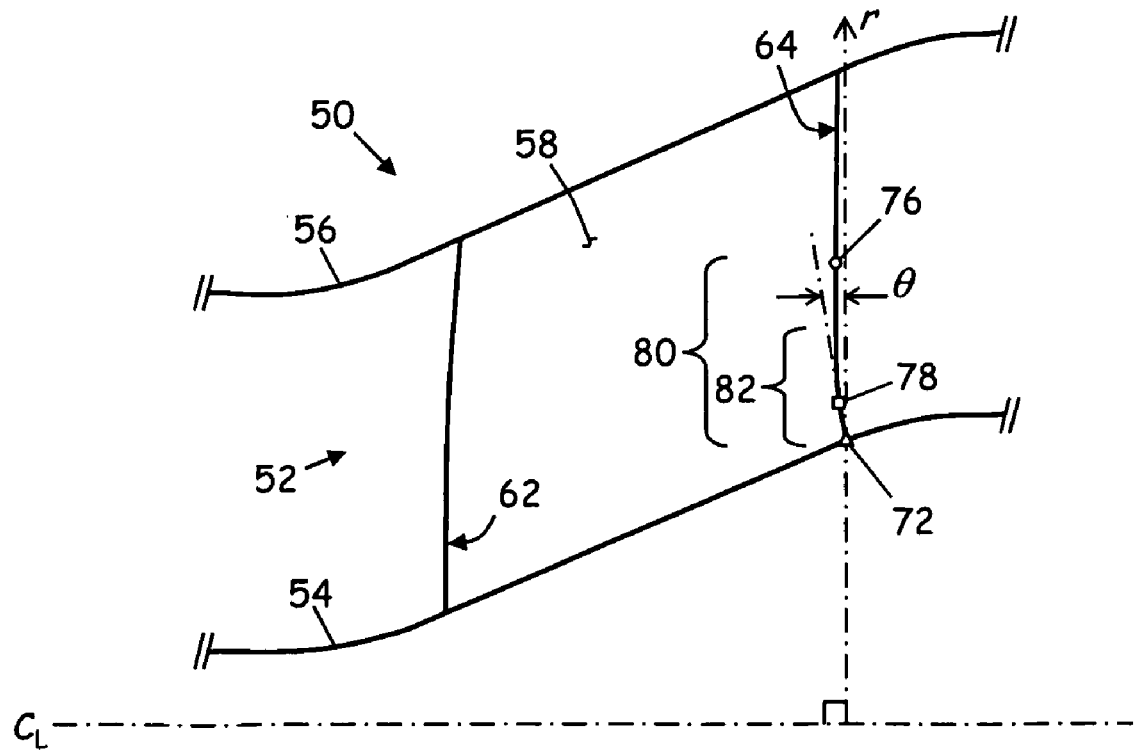
FIG. 4B is an additional circumferential view of the turbine vane in FIG. 4A, illustrating the axial trailing edge configuration.

FIGS. 4A and 4B are circumferential views of turbine vane 52, circumferentially projected within turbine vane ring 50. FIG. 4A shows leading and trailing edge radial spans $S_L$ and $S_T$, midpoint chord C, axial cord length A and duct angle α. FIG. 4B shows axial angle θ, as defined along trailing edge 64.

Turbine vane ring 50 forms a turning flow duct comprising inner flow annulus 54 (the radially inner flow boundary) and outer flow annulus 56 (the radially outer flow boundary). In the views of FIGS. 4A and 4B, convex (suction) surface 58 of turbine vane 52 is circumferentially projected within turbine vane ring 50, such that the vane geometry is represented in a plane containing turbine axis/centerline $C_L$ and radius r. Radius r is defined at innermost trailing edge point 72, at inner flow annulus 54, and is perpendicular to turbine axis/centerline $C_L$ as described above.

In the projected views of FIGS. 4A and 4B, turbine vane 52 extends substantially axially between leading edge 62 and trailing edge 64, and substantially radially between inner flow annulus 54 and outer flow annulus 56. Note, however, that these are projected views, and that in general the surfaces and edges of turbine vane 52 extend simultaneously in axial, radial and circumferential directions (see, e.g., the particular turning flow configuration of turbine vanes 52 and turbine vane ring 50, as shown in FIG. 2). In addition, turbine axis/centerline $C_L$ is arbitrarily spaced in the radial direction with respect to turbine vanes 52, and turbine vane ring 50 is arbitrarily located in the axial direction along centerline $C_L$.

As shown in FIG. 4A, leading edge 62 of turbine vane 52 has radial span $S_L$ and trailing edge 64 has radial span $S_T$. This defines average radial span S of turbine vane 52, across flow duct/turbine vane ring 50 between inner flow boundary 54 and outer flow boundary 56:

$$S = \frac{S_L + S_T}{2}. \quad [1]$$

Chord C is a midpoint chord defined between midpoint 74 of leading edge 62 and midpoint 76 of trailing edge 64. Midpoint chord C defines duct angle α with respect to the direction of turbine axis/centerline $C_L$, and has axial chord length A in this direction.

As described above, turbine vanes 52 are configured to reduce flow separation in turning flow ducts with substantial radial offset between the inlet and outlet, for example when flow duct angle α is more than fifteen degrees (α≧15°). In some embodiments, duct angle α is a large as twenty degrees or more (α≧20°), and in other embodiments duct angle α is thirty degrees or more (α≧30°).

In general, the aspect ratio of an airfoil is defined by the ratio of span squared to area, or in terms of average radial span S and axial length A of midpoint chord C, as defined in the circumferential view. In this case, aspect ratio R is sometimes defined as:

$$R = \frac{S_L + S_T}{2A}. \quad [2]$$

As shown in FIG. 4B, trailing edge 64 has axial angle θ with respect to radius r, as defined in the plane of turbine axis/centerline $C_L$ and radius r. In this particular embodiment, axial angle θ has a counterclockwise sense, as measured from radius r toward turbine axis/centerline $C_L$ in a forward or upstream direction. Alternatively, axial angle θ has a counterclockwise sense, as measured from radius r toward turbine axis/centerline $C_L$ in an aft or downstream direction.

Like circumferential angle φ, above, axial angle θ is most generally defined by the largest magnitude value at any given tangent point 78 within a particular region of interest. The region of interest the region where suction side 58 of turbine vane 52 is subject to flow detachment or separation, due at least in part to the turning flow configuration and the inlet/outlet offset (or duct angle) of flow duct 50. In some embodiments, the region of interest includes the entire radial span of trailing edge 64, from radially inner flow boundary 54 to radially outer flow boundary 56. In other embodiments the region of interest is a radially inner region of trailing edge 64, for example fifty-percent (50%) span region 80, extending from radially innermost point 72 at inner flow boundary 54 to midpoint 76 of trailing edge 64, or thirty percent (30%) span region 82, corresponding to the radially inner 30% of trailing edge span $S_T$.

In the region of interest, axial angle θ and circumferential angle φ are determined in order to improve the efficiency of turning flow operation by improving the pressure gradient and flow area distribution, minimizing the thickness and growth rate of the boundary flow region, and reducing flow detachment. These effects, in turn, depend upon the particular configuration of turbine ring 50, including turning angle, duct angle α, flow rate and working fluid composition, along with the other geometrical parameters of turbine vane 52, such as aspect ratio R.

In some embodiments, circumferential angle φ is no more than about five degrees (φ≦5°) in the region of interest, as defined in the direction opposite turning flow $F_T$. In an upstream view of a right-handed flow configuration, as shown FIGS. 3A-3C, this limit extends in a clockwise direction, opposite turning flow $F_T$, but circumferential angle φ is not limited in the counterclockwise direction, along turning flow $F_T$. In other embodiments circumferential angle ϕ is more than about ten degrees (ϕ≦10°) or about twenty degrees (ϕ≦20°), using the same definition.

Alternatively, circumferential angle ϕ is limited in both directions with respect to turning flow $F_T$, for example to a range of about five degrees (−5≦ϕ≦+5°), about ten degrees (−10≦ϕ≦+10°) or about twenty degrees (−20≦ϕ≦+20°). In further configurations, circumferential angle ϕ falls within any of these ranges, and is also nonzero (that is, circumferential angle ϕ excludes a small range about zero, for example ϕ≦−1° and ϕ≧+1°).

Like circumferential angle ϕ, above, aspect ratio R and axial angle θ vary from embodiment to embodiment, depending upon flow configuration and the other geometrical properties of turbine vane 52. In some embodiments, for example, aspect ratio R varies in a range of about one or less (R≦1.0), about four fifths or less (R≦0.8), or about three fifths or less (R≦0.6). Similarly, trailing edge axial angle θ varies in a range of up to about two degrees (θ≦2°), up to about three degrees (θ≦3°), or up to about four degrees (θ≦4°), as measured in either direction from radius r. Like circumferential angle ϕ, axial angle θ sometimes excludes a small range about zero (for example, θ≦−1° and θ≧+1°).

The present invention has been described with reference to particular embodiments. The terminology used is for the purposes of description, not limitation, and workers skilled in the art will recognize that changes may be made in form and detail without departing from the spirit and scope of the invention.

The invention claimed is:

1. An airfoil with turning flow, the airfoil comprising:
 a first surface and a second surface, the first and second surface extending from a leading edge to a trailing edge;
 a chord extending from a midpoint of the leading edge to a midpoint of the trailing edge, the chord defining a duct angle of at least fifteen degrees with respect to a turbine axis;
 an axial length of the chord along the turbine axis, the axial length defining an aspect ratio of at most one with respect to an average radial span of the leading and trailing edges; and
 a region of the trailing edge, wherein an axial angle of the trailing edge is at most four degrees in the region and a circumferential angle of the trailing edge is at most ten degrees in the region, the circumferential angle being defined in a direction opposite the turning flow.

2. The airfoil of claim 1, wherein the axial angle is defined in a plane containing the turbine axis and a radius through an innermost point of the trailing edge.

3. The airfoil of claim 2, wherein the circumferential angle is defined in a plane perpendicular to the turbine axis and containing the radius.

4. The airfoil of claim 1, wherein the aspect ratio is no more than four fifths.

5. The airfoil of claim 1, wherein the region of the trailing edge comprises a complete radial span of the trailing edge.

6. The airfoil of claim 1, wherein the region of the trailing edge comprises a radially innermost thirty percent span of the trailing edge.

7. The airfoil of claim 1, wherein the circumferential angle is no more than ten degrees in the region, as defined in a direction along the turning flow.

8. The airfoil of claim 7, wherein the circumferential angle is nonzero.

9. The airfoil of claim 7, wherein the circumferential angle is no more than five degrees in the region, as defined in either the direction opposite the turning flow or in the direction along the turning flow.

10. The airfoil of claim 6, wherein the axial angle is no more than three degrees in the region.

11. A turbine vane comprising:
 a leading edge and a trailing edge, wherein the leading and trailing edges have an average span in a radial direction and wherein the radial direction is defined at a radially innermost point of the trailing edge;
 pressure and suction surfaces extending between the leading and trailing edges and defining an airfoil with turning flow therebetween;
 a midpoint chord extending in an axial direction between the leading edge and the trailing edge, wherein the midpoint chord defines a duct angle of at least fifteen degrees with respect to the axial direction and an aspect ratio of no greater than one with respect to the average span; and
 a radially inner region comprising a thirty percent span of the trailing edge, the radially inner region having an axial angle of no greater than four degrees and a circumferential angle of no greater than twenty degrees.

12. The turbine vane of claim 11, wherein the aspect ratio is no greater than four fifths.

13. The turbine vane of claim 12, wherein the aspect ratio is no greater than three fifths.

14. The turbine vane of claim 11, wherein the radially inner region comprises a thirty percent span of the trailing edge.

15. The turbine vane of claim 14, wherein the axial angle is no greater than three degrees.

16. The turbine vane of claim 15, wherein the axial angle is no greater than two degrees.

17. The turbine vane of claim 14, wherein the circumferential angle is no greater than ten degrees.

18. The turbine vane of claim 17, wherein the circumferential angle is no greater than five degrees.

19. The turbine vane of claim 14, wherein the radially inner region comprises a fifty percent span of the trailing edge.

20. The turbine vane of claim 19, wherein the axial and circumferential angles are nonzero.

21. A turbine vane ring comprising:
 an inner flow annulus and an outer flow annulus coaxially oriented about a turbine axis;
 a plurality of vanes defining a turning flow direction about the turbine axis, each of the plurality of vanes comprising:
  leading and trailing edges extending for an average radial span between the inner flow annulus and the outer flow annulus;
  pressure and suction surfaces extending for an axial chord length between the leading and trailing edges;
  an aspect ratio of no more than one, as defined by the average radial span and the axial chord length;
  a duct angle of at least fifteen degrees, as defined with respect to the turbine axis;
  an axial angle of no more than four degrees, as defined within a radially inner thirty percent span of the trailing edge; and a circumferential angle of no more than ten degrees, as defined within the radially inner thirty percent span and as measured into the turning flow direction.

22. The turbine vane ring of claim 21, wherein the axial angle and the circumferential angle are defined within a radially inner fifty percent span of the trailing edge.

23. The turbine vane ring of claim 21, wherein the circumferential angle is nonzero, and is measured either into the turning flow direction or with the turning flow direction.

24. The turbine vane ring of claim 21, wherein the inner flow annulus and the outer flow annulus comprise a transition duct configured for flow between a high pressure turbine and a low pressure turbine.

25. The turbine vane ring of claim 24, wherein the high pressure turbine is configured to drive a compressor and the low pressure turbine is configured to drive a turbofan.

* * * * *

UNITED STATES PATENT AND TRADEMARK OFFICE
CERTIFICATE OF CORRECTION

| | | |
|---|---|---|
| PATENT NO. | : 8,075,259 B2 | Page 1 of 1 |
| APPLICATION NO. | : 12/371414 | |
| DATED | : December 13, 2011 | |
| INVENTOR(S) | : Thomas J. Praisner et al. | |

It is certified that error appears in the above-identified patent and that said Letters Patent is hereby corrected as shown below:

Col. 1, Line 46
  Delete "modem"
  Insert --modern--

Signed and Sealed this
Fourteenth Day of February, 2012

David J. Kappos
*Director of the United States Patent and Trademark Office*